May 15, 1923.
R. B. ADAMS
NUT LOCK
Filed July 8, 1921
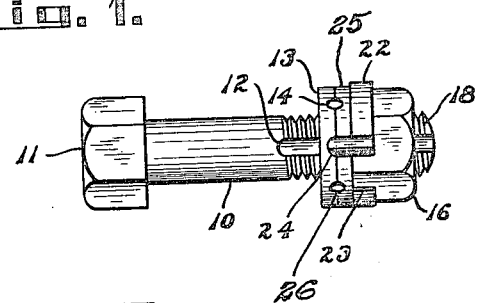
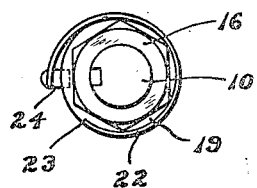
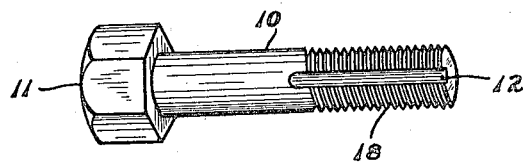
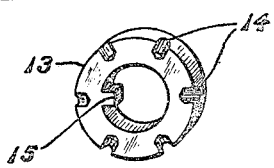
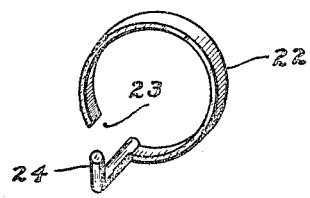
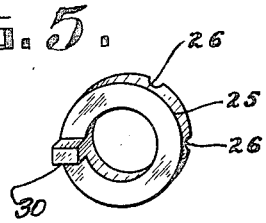
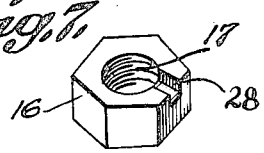
Robert B. Adams.
INVENTOR
BY *Victo J. Evans*
ATTORNEY
*John Bebis Jr.*
WITNESS:

Patented May 15, 1923.

1,455,700

UNITED STATES PATENT OFFICE.

ROBERT B. ADAMS, OF KEMPTON, PENNSYLVANIA.

NUT LOCK.

Application filed July 8, 1921. Serial No. 483,329.

*To all whom it may concern:*

Be it known that I, ROBERT B. ADAMS, a citizen of the United States, residing at Kempton, in the county of Berks and State of Pennsylvania, have invented new and useful Improvements in Nut Locks, of which the following is a specification.

This invention relates to nut locks and the object is to provide in connection with a bolt slotted longitudinally a lock washer of particular construction to be applied to the bolt, a nut co-operating with the washer in a certain novel manner hereinafter described, and means whereby the nut is held against rotary movement with reference to the washer and therefore with reference to the bolt.

A further object is to provide, in connection with a washer held against rotation with reference to the bolt and having notches formed therein, a second or outer washer having notches for registration with those of the washer first named and having a lug thereon, a nut having a recess or notch for engagement by the lug, and a resilient device having an engaging device thereon for entering registering notches in the washers, and retaining the outer washer and nut against rotation with reference to the other washer and bolt.

With the foregoing and other objects in view, the invention consists in the novel construction and arrangement of elements described and claimed, it being understood that modifications may be made within the scope of the claims without departing from the spirit of the invention.

In the accompanying drawings:

Figure 1 is the device in side elevation.

Figure 2 is an end view.

Figure 3 is a perspective view of the longitudinally grooved bolt.

Figure 4 is a perspective view of the notched washer having an internal key for co-operating with the groove of the bolt.

Figure 5 is a perspective view of a washer having a lug thereon; Figure 6 is a perspective view of a spring ring adapted to surround the nut, and carrying an engaging device for entering registering notches of the two washers, and Figure 7 is a perspective view of a recessed nut for engagement by the lug of one of the washers.

The bolt 10 is provided with a head 11 and with a longitudinal slot 12, and a washer 13 is formed with notches 14 and with an internal lug or key 15, the latter being adapted to enter the groove 12 in the bolt, so that the washer is non-rotatable, although provided with a smooth bore.

In order to prevent the rotation of the nut 16 to be applied to the bolt, said nut is made non-rotatable with reference to the washer. This nut 16 has a threaded bore 17 for co-operation with the thread 18 of the bolt, and the nut is further provided with a notch or recess 28 engaged by lug 30 on a washer 25, this washer having notches 26 adapted for registration with the notches 14, when the nut 16 is screwed home.

A spring ring 22 is split as shown at 23 and is provided with a hook-like portion 24, the end of the hook being at approximately right angles with the shank thereof. This hook-like portion 24 may otherwise be termed an L-shaped member.

After the nut 16 is screwed home and the notches 26 of element 25 and the notches 14 of the washer 13 have been brought into registration, the spring ring 22 is applied, and the hook-like portion 24 of the spring ring 22 is caused to enter said registering notches, in order to prevent relative rotation between the washers, it being understood that the washers are locked against rotation with reference to bolt 10, and the nut is rigid with reference to the outer washer.

Having described my invention, what I claim as new and desire to secure by Letters Patent is:

The combination with a bolt provided with threads and with a longitudinal slot of a washer provided with notches on one face thereof and provided with an inwardly extending lug entering the aforesaid slot, a second washer provided with notches adapted for registration with those first named, said second washer including a projecting element on one face thereof, and a nut having threads for engaging the threads in the bolt and provided with a notch on one face thereof, the notch being proportioned for receiving the projecting element on the second washer, an annular resilient element proportioned to surround the nut, and including an engaging device having an annular portion adapted to project into registering apertures of the second washer and the foresaid washer.

In testimony whereof I affix my signature.

ROBERT B. ADAMS.